United States Patent
Pham

(10) Patent No.: US 9,563,822 B2
(45) Date of Patent: Feb. 7, 2017

(54) LEARNING APPARATUS, DENSITY MEASURING APPARATUS, LEARNING METHOD, COMPUTER PROGRAM PRODUCT, AND DENSITY MEASURING SYSTEM

(71) Applicant: KABUSHIKI KAISHA TOSHIBA, Minato-ku, Tokyo (JP)

(72) Inventor: Quoc Viet Pham, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 27 days.

(21) Appl. No.: 14/616,867

(22) Filed: Feb. 9, 2015

(65) Prior Publication Data
US 2015/0242709 A1 Aug. 27, 2015

(30) Foreign Application Priority Data
Feb. 21, 2014 (JP) .................................. 2014-031847

(51) Int. Cl.
*G06K 9/62* (2006.01)

(52) U.S. Cl.
CPC .......... *G06K 9/6259* (2013.01); *G06K 9/6219* (2013.01); *G06K 9/6226* (2013.01)

(58) Field of Classification Search
CPC ...... G06T 7/2033; G06T 7/204; G06T 7/2046; G06T 7/2053; G06T 7/206; G06T 7/2066
See application file for complete search history.

(56) References Cited

U.S. PATENT DOCUMENTS 5,949,481 A * 9/1999 Sekine .................. G01S 3/7864
348/207.99
8,548,260 B2 * 10/2013 Okada ................ G06K 9/00375
382/159

(Continued)

FOREIGN PATENT DOCUMENTS

JP 2004-191083 7/2004
JP 2007-065878 3/2007

(Continued)

OTHER PUBLICATIONS

Fiaschi, Luca, et al.; Learning to Count with Regression Forest and Structured Labels; Int. Conf. Pattern Recognition; 2012; pp. 2685-2688.

(Continued)

*Primary Examiner* — Chan Park
*Assistant Examiner* — Iman K Kholdebarin
(74) *Attorney, Agent, or Firm* — Amin, Turocy & Watson LLP

(57) ABSTRACT

A first extracting unit extracts partial images from a learning image. A first calculator calculates a feature amount of the partial image. A retrieving unit retrieves objects included in the partial image, and gives, as a label, a vector to the feature amount. The vector represents relative positions between a first position in the partial image and each object included in the partial image. A voting unit generates a voting histogram for each partial image. A learning unit divides the feature amount of each partial image into clusters to reduce variation of the corresponding voting histogram, so as to learn a regression model representing a relationship between the feature amount of the partial image and the relative position of the object included in the partial image. A first predicting unit predicts, for each cluster, a representative label from the label given to the feature amount belonging to the cluster.

9 Claims, 13 Drawing Sheets

(56) References Cited

U.S. PATENT DOCUMENTS

| | | | |
|---|---|---|---|
| 9,311,301 B1* | 4/2016 | Balluru | G06F 17/278 |
| 2002/0057343 A1* | 5/2002 | Ronk | G06F 17/30256 |
| | | | 348/169 |
| 2005/0254686 A1* | 11/2005 | Koizumi | G06K 9/6203 |
| | | | 382/103 |
| 2010/0208140 A1* | 8/2010 | Fukunishi | H04N 5/145 |
| | | | 348/576 |
| 2012/0207346 A1* | 8/2012 | Kohli | G06K 9/6211 |
| | | | 382/103 |
| 2013/0230245 A1* | 9/2013 | Matsumoto | G06K 9/00369 |
| | | | 382/173 |
| 2014/0108401 A1* | 4/2014 | Namazifar | G06F 17/30312 |
| | | | 707/736 |
| 2014/0184803 A1* | 7/2014 | Chu | G06T 7/2093 |
| | | | 348/159 |
| 2014/0286568 A1* | 9/2014 | Saruta | G06K 9/6211 |
| | | | 382/159 |
| 2015/0235377 A1* | 8/2015 | Wang | G06T 7/0081 |
| | | | 382/103 |
| 2015/0243031 A1* | 8/2015 | Narasimha | G06T 7/0042 |
| | | | 382/103 |
| 2015/0294193 A1* | 10/2015 | Tate | G06K 9/00785 |
| | | | 382/159 |
| 2016/0217583 A1* | 7/2016 | Uchida | G06T 7/0071 |

FOREIGN PATENT DOCUMENTS

| | | |
|---|---|---|
| JP | 2010-204826 | 9/2010 |
| JP | 2012-108785 | 6/2012 |

OTHER PUBLICATIONS

Lowe, David G.; Object Recognition from Local Scale-Invariant Features; Proc. of the International Conference on Computer Vision; Sep. 1999; pp. 1150-1157; vol. 2; Corfu.

* cited by examiner

… (1) …

LEARNING APPARATUS, DENSITY MEASURING APPARATUS, LEARNING METHOD, COMPUTER PROGRAM PRODUCT, AND DENSITY MEASURING SYSTEM

CROSS-REFERENCE TO RELATED APPLICATIONS

This application is based upon and claims the benefit of priority from Japanese Patent Application No. 2014-031847, filed on Feb. 21, 2014; the entire contents of which are incorporated herein by reference.

FIELD

Embodiments described herein relate generally to a learning apparatus, a density measuring apparatus, a learning method, a computer program product, and a density measuring system.

BACKGROUND

There has been proposed an apparatus that calculates the density of an object included in an input image. For example, there is known a technique that learns a random forest representing the association between the feature amount of a partial image and the object density data of the partial image. This technique uses this random forest to measure the object density of the input image. Additionally, there is known a technique that detects a part of the person included in the input image. This technique calculates the number of persons included in the input image from a detection result.

However, in the technique that learns the random forest, the data volume of the object density data is large. Accordingly, the density calculation requires an enormous memory capacity. In the technique that detects a part of the person, the detection accuracy is decreased as the object such as the person included in the input image becomes smaller, or as the input image includes a larger overlap. Accordingly, with the conventional techniques, it is not possible to perform the density calculation with high accuracy and low memory capacity.

DETAILED DESCRIPTION

According to an embodiment, a learning apparatus includes a first extracting unit, a first calculator, a retrieving unit, a voting unit, a learning unit, and a first predicting unit. The first extracting unit extracts a plurality of first partial images from a learning image. The first calculator calculates a feature amount of the first partial image. The retrieving unit retrieves objects included in the first partial image, and gives, as a label, a vector to the feature amount. The vector represents relative positions between a first position in the first partial image and each of all objects included in the first partial image. The voting unit calculates, for each of the plurality of first partial images, a histogram representing a distribution of the relative positions and votes the histogram into a parameter space so as to generate a voting histogram. The learning unit divides the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image. The first predicting unit predicts, for each of the plurality of clusters, a representative label from the label given to the feature amount that belongs to the cluster.

Various embodiments will be described in detail with reference to the accompanying drawings.

First Embodiment

Figure 1:
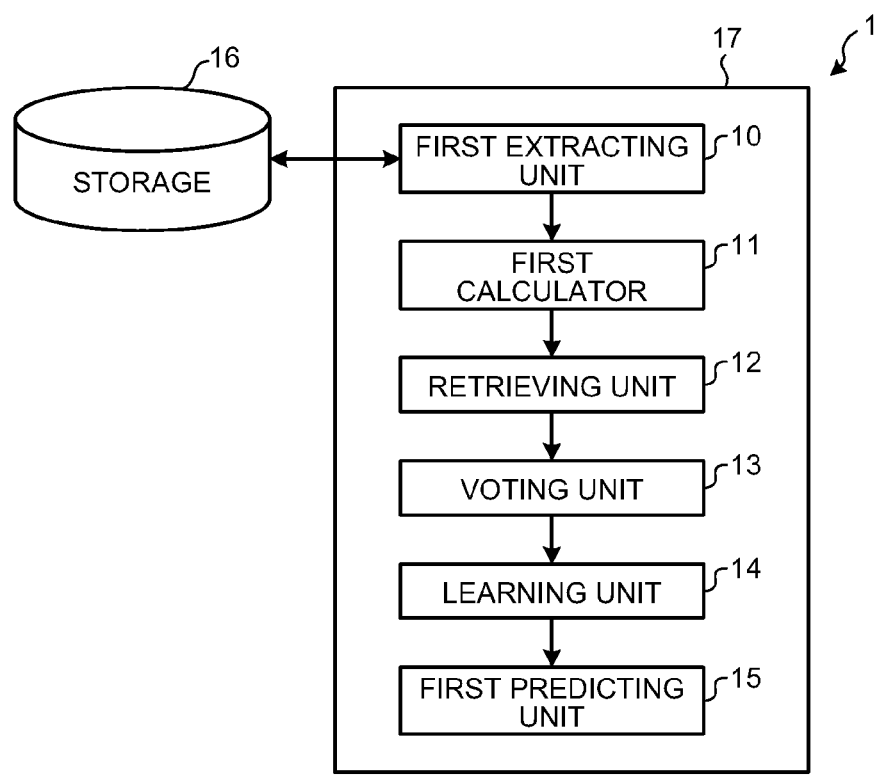
FIG. 1 is a block diagram illustrating a functional configuration of a learning apparatus.

FIG. 1 is a block diagram illustrating a functional configuration of a learning apparatus 1 according to a first embodiment. The learning apparatus 1 includes a storage 16 and a controller 17. The storage 16 and the controller 17 electrically connected to each other.

The storage 16 preliminarily stores therein a learning image. The storage 16 is implemented by, for example, at least any of storage devices that allow magnetic, optical, or electrical storage, such as a hard disk drive (HDD), a solid state drive (SSD), a read only memory (ROM), and a memory card.

The learning image is a target image to be learned in the learning apparatus 1. The learning image includes one or a plurality of objects. In this embodiment, as one example, a description will be given of the case the object is a person. However, the object is not limited to the person.

Figure 2:
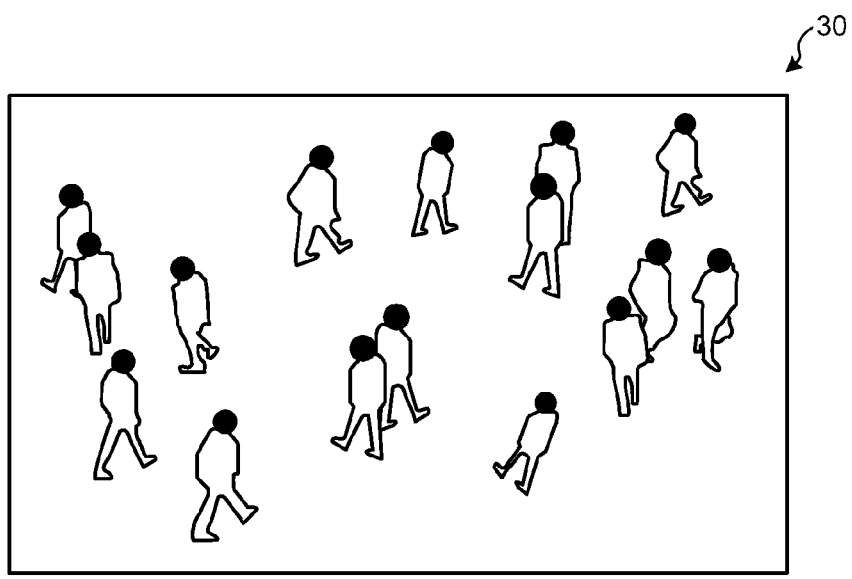
FIG. 2 is a diagram illustrating an example of a learning image.

FIG. 2 is a diagram illustrating an example of the learning image 30. The learning image 30 is, for example, an image where a mark is given to the center of each object. The controller 17 recognizes the portion of this mark as an object and executes processing described later. Here, the controller 17 may retrieve an object in the learning image 30 and gives a mark to the center of the object. In this embodiment, a description will be given of the case where the learning image 30 is the image where a mark is attached to the center of the head of a person as an object.

Referring back to FIG. 1, the controller 17 is a computer that includes, for example, a central processing unit (CPU), a read only memory (ROM), and a random access memory (RAM). Here, the controller 17 may be implemented by such as circuitry or a circuit other than the CPU.

The controller 17 controls the entire learning apparatus 1. The learning apparatus 1 includes a first extracting unit 10, a first calculator 11, a retrieving unit 12, a voting unit 13, a learning unit 14, and a first predicting unit 15.

A part or all of the first extracting unit 10, the first calculator 11, the retrieving unit 12, the voting unit 13, the learning unit 14, and the first predicting unit 15 may be implemented by, for example, causing a processing unit such as a CPU to execute programs, that is, by software, may be implemented by hardware such as an integrated circuit (IC), or may be implemented by combining software and hardware.

The first extracting unit 10 extracts a plurality of first partial images from the learning image 30. The first extracting unit 10 may read the learning image 30 from the storage 16 or may obtain the learning image 30 from outside.

The first partial image is an image of a part of the learning image 30, and is an image including at least one object. In this embodiment, a description will be given of the case where the first partial image is an image of a part of the learning image 30 extracted in a rectangular shape. Here, the shape of the first partial image is not limited to the rectangular shape, and may be any shape.

Figure 3A:
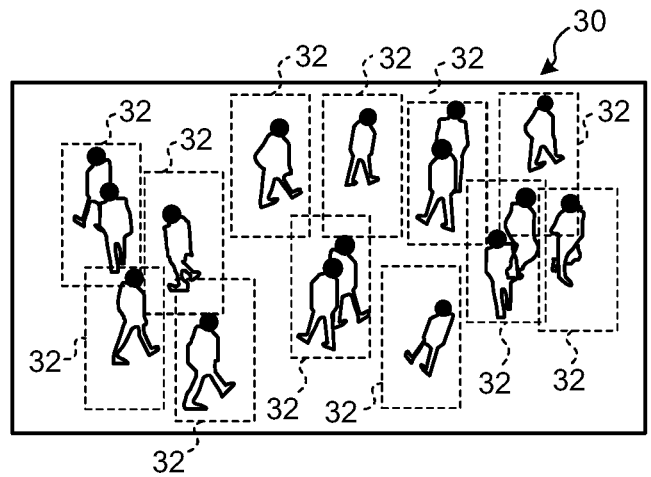
FIGS. 3A to 3D are explanatory diagrams of a learning image, first partial images, and a label.
Figure 3B:
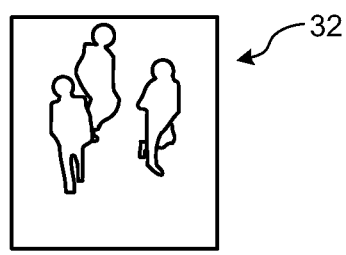

FIGS. 3A to 3D are explanatory diagrams of the learning image 30, first partial images 32, and a label 34 (described later in detail). FIG. 3A is a diagram illustrating one example of the learning image 30. FIG. 3B is a diagram illustrating one example of the first partial image 32.

On the learning image 30, the first extracting unit 10 moves the region in a rectangular shape as a target to be extracted, and extracts a plurality of the first partial images 32 (see FIG. 3A). The plurality of the first partial images 32 to be extracted from the learning image 30 have the mutually same size and same shape.

The plurality of the first partial images 32 to be extracted from the learning image 30 may at least partially overlap with one another. The number of the first partial images 32 to be extracted from the learning image 30 by the first extracting unit 10 only needs to be two or more. The number of the first partial images 32 to be extracted is preferred to be a larger number. Specifically, the first extracting unit 10 is preferred to extract 1000 or more of the first partial images 32 from the learning image 30.

As the number of the first partial images 32 to be extracted from the learning image 30 by the first extracting unit 10 becomes larger, the learning apparatus 1 can learn a regression model that allows calculating the density with high accuracy in a density measuring apparatus described later.

Referring back to FIG. 1, the first calculator 11 calculates respective feature amounts of the plurality of the first partial images 32 extracted by the first extracting unit 10. The feature amount is the value indicating the feature of the first partial image 32. The feature amount employs, for example, the result of discretizing the pixel values of the pixels that constitute the partial image and then one-dimensionally arranging the discretized pixel values or the result of normalizing these one-dimensionally arranged pixel values with the difference (that is, the gradient) from the adjacent pixel value in these one-dimensionally arranged pixel values. Alternatively, the feature amount may employ a SIFT feature (see D. Lowe ", Object recognition from local scale-invariant features," Int. Conf. Comp. Vision, Vol. 2, pp. 1150-1157, 1999) or similar feature. The SIFT feature is the histogram feature that is strong against a slight change.

The retrieving unit 12 gives a label to each feature amount of the plurality of the first partial images 32. The label represents the relative position between the object included in each first partial image 32 and a first position in each first partial image 32. Specifically, the retrieving unit 12 firstly retrieves objects included in each of the plurality of the first partial images 32 extracted by the first extracting unit 10. Subsequently, the retrieving unit 12 generates, for each first partial image 32, a vector representing the relative positions between the first position in the first partial image 32 and each of all the objects included in the first partial image 32 as a label. Subsequently, the retrieving unit 12 gives the generated label to the feature amount of the corresponding first partial image 32.

The first position only needs to be any predetermined position within the partial image. In this embodiment, the first position will be described as the center position (the center of the first partial image 32) in the first partial image 32.

Figure 3C:
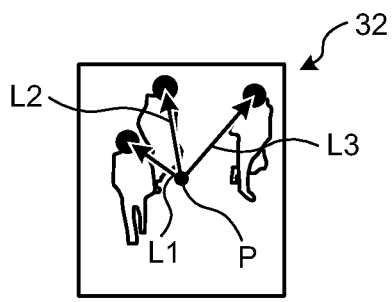
Figure 3D:
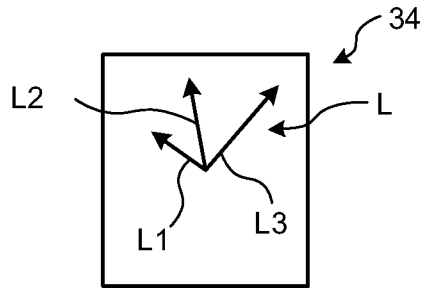

FIG. 3C and FIG. 3D are explanatory diagrams of the label 34. For example, the retrieving unit 12 retrieves objects included in each of the first partial images 32 illustrated in FIG. 3A. Subsequently, the retrieving unit 12 generates vectors L1, L2, and L3 representing the relative positions between a center position P of the first partial image 32 and each of all objects (three objects in the example illustrated in FIGS. 3B and 3C) included in the first partial image 32 (see FIG. 3C). Subsequently, the retrieving unit 12 gives a vector L that is a set of these vectors L1, L2, and L3 to the feature amount of the first partial image 32 as the label 34 (see FIG. 3D).

Referring back to FIG. 1, the voting unit 13 calculates, for each of the plurality of the first partial images 32, a histogram representing the distribution of the relative positions of the objects included in each first partial image 32.

Figure 4:
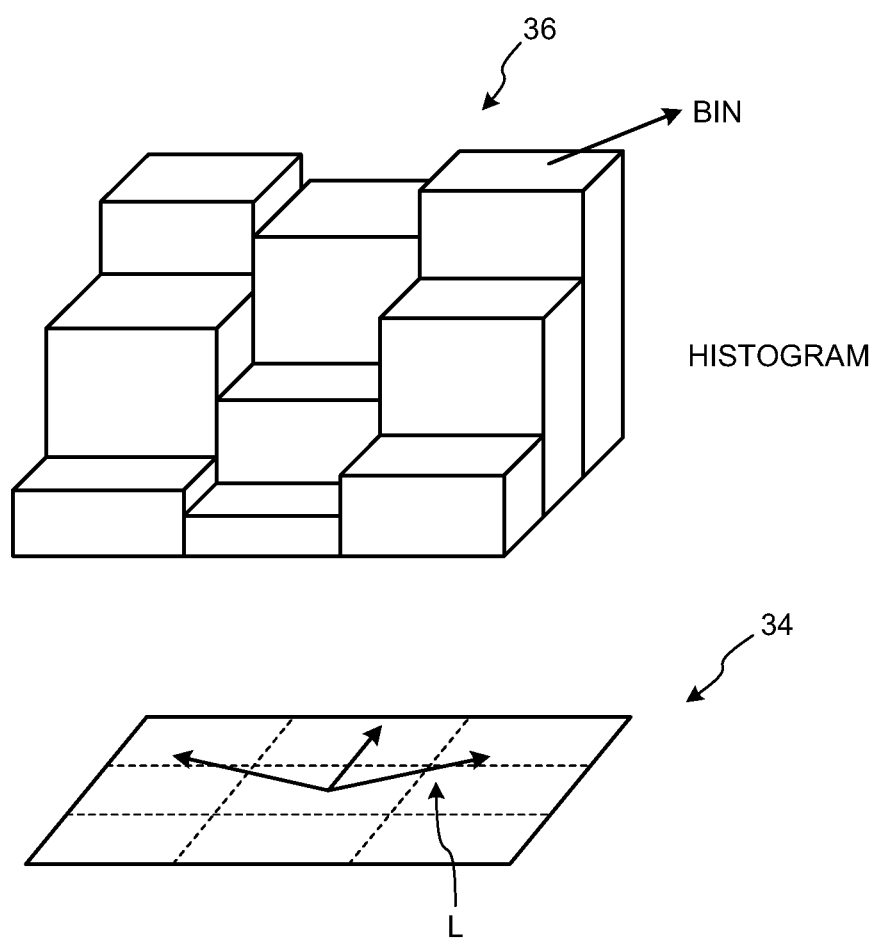
FIG. 4 is an explanatory diagram of the label and a histogram.

FIG. 4 is an explanatory diagram of the label 34 and a histogram 36. As illustrated in FIG. 4, the voting unit 13 calculates the histogram 36 from the label 34.

The histogram 36 is a collection of bins uniformly arranged in the first partial image 32. The size of the bin in the histogram 36 is determined according to the relative positions of the objects included in the first partial image 32. For example, the size of the bin in a position b in the first partial image 32 is expressed by the following formula (1).

$$B(b) = \Sigma N(b; oj, \sigma) \quad (1)$$

In the formula (1), B(b) denotes the size of the bin in the position b in the first partial image 32. Additionally, oj denotes the position of the object. In the formula (1), N(b; oj, σ) is a value of the probability density function for the normal distribution of (the center oj, the dispersion σ) in the position b.

Referring back to FIG. 1, subsequently, the voting unit 13 votes each histogram 36 calculated for each of the plurality of the first partial images 32 into a parameter space. Accordingly, the voting unit 13 generates, for each of the plurality of the first partial images 32, a voting histogram corresponding to each first partial image 32.

Figure 5:
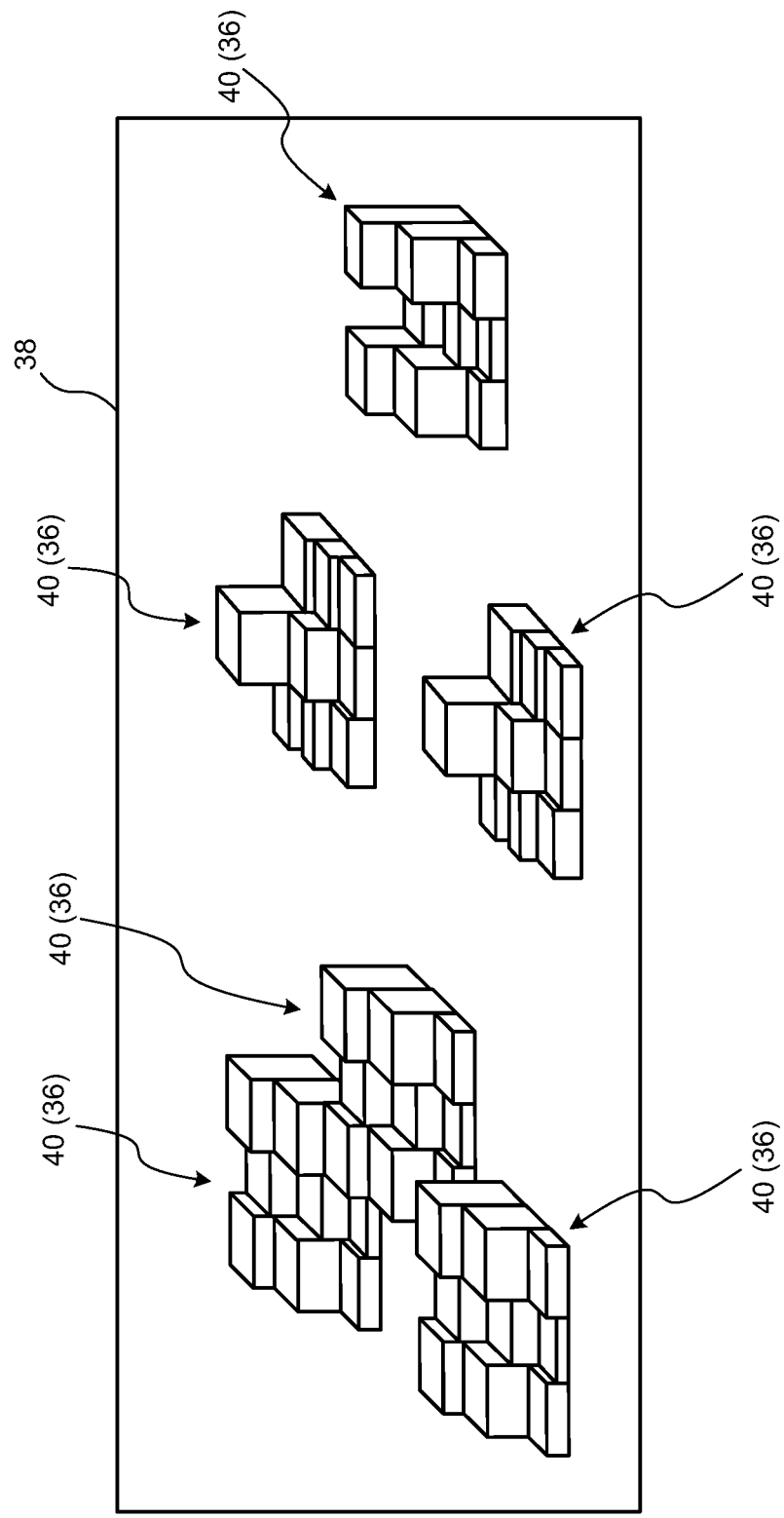
FIG. 5 is an explanatory diagram of a voting histogram.

FIG. 5 is an explanatory diagram of the voting histogram 40. The histogram 36 is voted into a parameter space 38 to be a voting histogram 40. In FIG. 5, the parameter space is simply illustrated in two dimensions.

In this embodiment, the parameter space will be described as a three-dimensional parameter space (x, y, s). Here, (x, y) denotes a two-dimensional position (x, y) within the partial image, and (s) denotes a size (s) of the object. The parameter space may be a multi-dimensional parameter space to which the posture of the object, the direction of the object, and similar parameter are added other than the above-described parameters.

Referring back to FIG. 1, the learning unit 14 learns a regression model representing the relationship between the feature amount of the first partial image 32 and the relative position of the object included in the first partial image 32. Specifically, the learning unit 14 divides the feature amount with the label 34 corresponding to each of the plurality of the first partial images 32 into a plurality of clusters to reduce the variation of the corresponding voting histogram, so as to learn the regression model.

In this embodiment, a description will be given of the case where the regression model is one or a plurality of random trees. The plurality of random trees is, that is, a random forest. In this embodiment, the cluster means a leaf node that is a node at the end of the random tree.

In this embodiment, learning the regression model by the learning unit 14 means: determining a division index for each of nodes from a root node via child nodes to leaf nodes represented by the random tree, and also determining the feature amount that belongs to the leaf nodes. Here, this feature amount is the feature amount with the label 34 as described above.

In this embodiment, the learning unit 14 determines the division index for each of the nodes from the root node via the child nodes to a plurality of leaf nodes and also determines the feature amount that belongs to each of the plurality of leaf nodes to reduce the variation of the voting histogram 40, so as to learn the regression model.

The learning unit 14 is preferred to learn a plurality of regression models with different combinations of the division indexes. In this embodiment, the learning unit 14 changes the combination of the division indexes for each node so as to learn a predetermined number (hereinafter referred to as T) of regression models.

Figure 6:
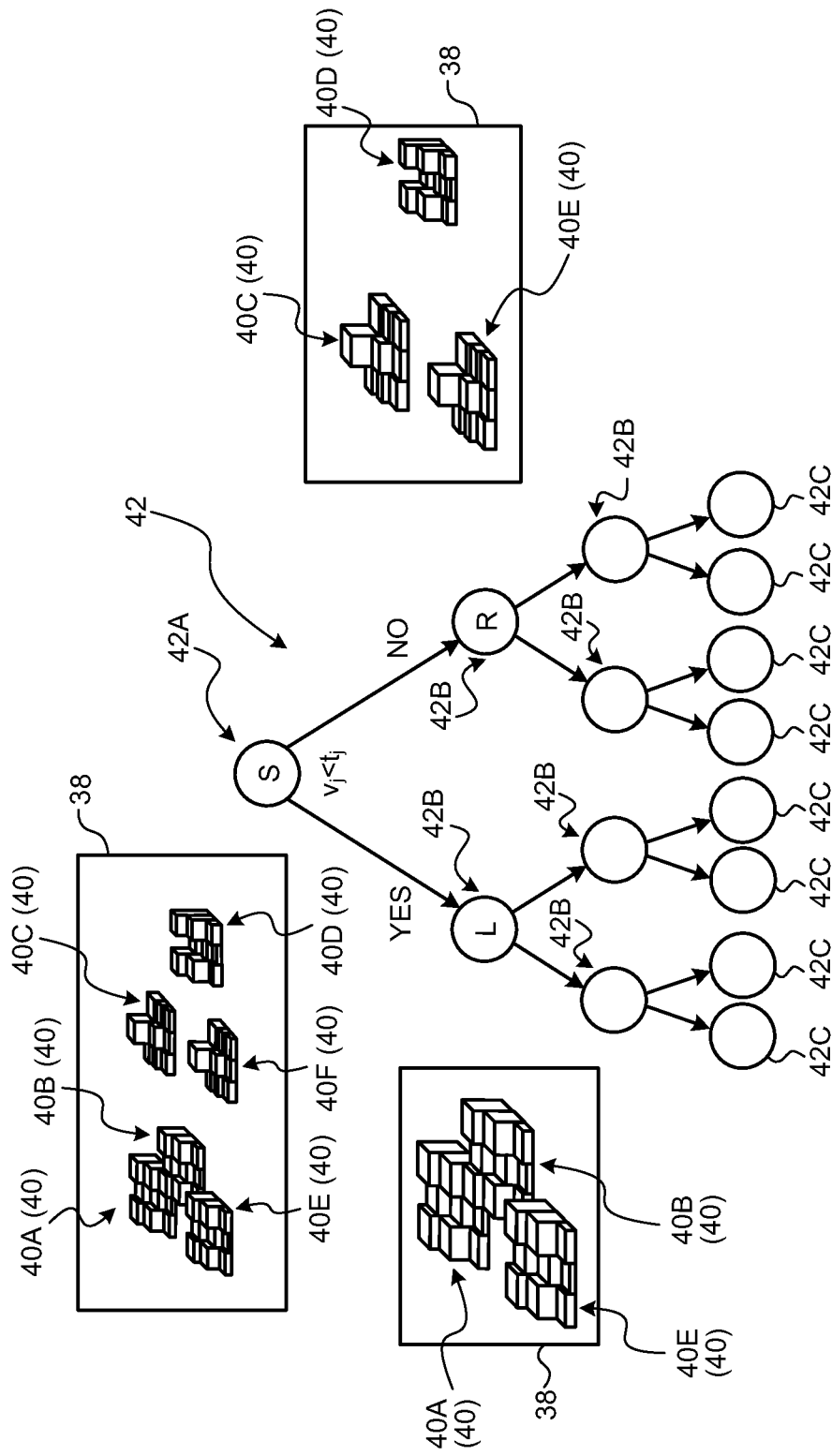
FIG. 6 is an explanatory diagram of a random tree.

FIG. 6 is an explanatory diagram of the random tree 42.

FIG. 6 illustrates the voting histograms 40 of the parameter space 38 simplified in two dimensions next to the respective nodes. In the example illustrated in FIG. 6, as the voting histograms 40 corresponding to the respective feature amounts for a plurality of the first partial images 32, a voting histogram 40A to a voting histogram 40F are illustrated. Hereinafter, the feature amount of the first partial image 32 is described as a feature amount v in some cases. As described above, a label is given to this feature amount v.

Firstly, the learning unit 14 allocates all the feature amounts v with the labels calculated by the first calculator 11 and the retrieving unit 12 to "S" that is a root node 42A.

The learning unit 14 determines the division index when "S" as this root node 42A is divided into "L" and "R" as respective two child nodes 42B. The division index is determined by an element vj of the feature amount v and a threshold value tj of the element vj.

Specifically, the learning unit 14 determines the division index for a division-source node so as to reduce the variation of the voting histogram in a division-destination node (the child node 42B or a leaf node 42C). The division index is determined by the element vj of the feature amount v and the threshold value tj of the element vj.

Particularly, the learning unit 14 determines the division index (hereinafter referred to as a tentative allocation operation) assuming that the feature amount v with the label satisfying the relationship of the element vj<the threshold value tj is allocated to "L" as the child node 42B (in the case of yes in FIG. 6) and the feature amount v without satisfying the relationship of the element vj<the threshold value tj is allocated to "R" as the child node 42B (in the case of no in FIG. 6).

At this time, the learning unit 14 determines the division index of the feature amount v to reduce the variation of the voting histogram 40. For example, the learning unit 14 determines the division index using the following formula (2).

$$G=\Sigma\{H(l)-HL\}^2+\Sigma\{H(r)-HR\}^2 \qquad (2)$$

In the formula (2), H (l) denotes the voting histogram 40 obtained by dividing "S" as the root node 42A into "L" as the child node 42B. In the formula (2), H (r) denotes the voting histogram 40 obtained by dividing "S" as the root node 42A into "R" as the child node 42B. In the formula (2), HL is the average value of all the H (l). Additionally, HR is the average value of all the H (r).

Here, the formula that the learning unit 14 uses for determining the division index is not limited to the formula (2).

The learning unit 14 determines, for each node, the division index such that the variation of the voting histogram 40 becomes smallest, and then repeats this tentative allocation operation from the root node 42A via the child node 42B to the leaf node 42C. That is, the learning unit 14 determines, for each node, the combination of the element vj and the threshold value tj as the division index such that the value of G becomes smallest in the above-described formula (2), and then repeats dividing the feature amount v that belongs to each node.

Then, the learning unit 14 determines, as the leaf node 42C, the node when the termination condition is satisfied. The termination condition is, for example, at least one of a first condition, a second condition, and a third condition. The first condition is when the number of the feature amounts v included in the node is smaller than a predetermined number. The second condition is when the depth of the tree structure of the random tree 42 is larger than a predetermined value. The third condition is when the value of the division index is smaller than a predetermined value.

With this determination of the leaf node 42C, the learning unit 14 learns the feature amount v that belongs to the leaf node 42C.

As described above, the learning unit 14 determines the division index of each node from the root node 42A via the child node 42B to the leaf node 42C and also determines the feature amount v that belongs to the leaf node 42C, so as to learn the random tree 42. The learning unit 14 changes the combination of the division index and performs the above-described tentative allocation operation so as to learn the predetermined number T of the random trees 42.

The number T of the random trees 42 to be learned by the learning unit 14 may be 1 or may be any number equal to or more than 2. As the learning unit 14 learns a larger number of the random trees 42 from the learning image 30, the learning apparatus 1 can learn the random tree 42 that allows calculating the density with high accuracy in the density measuring apparatus described later. That is, the learning unit 14 is preferred to learn the random forest as the plurality of the random trees 42.

Figure 7:
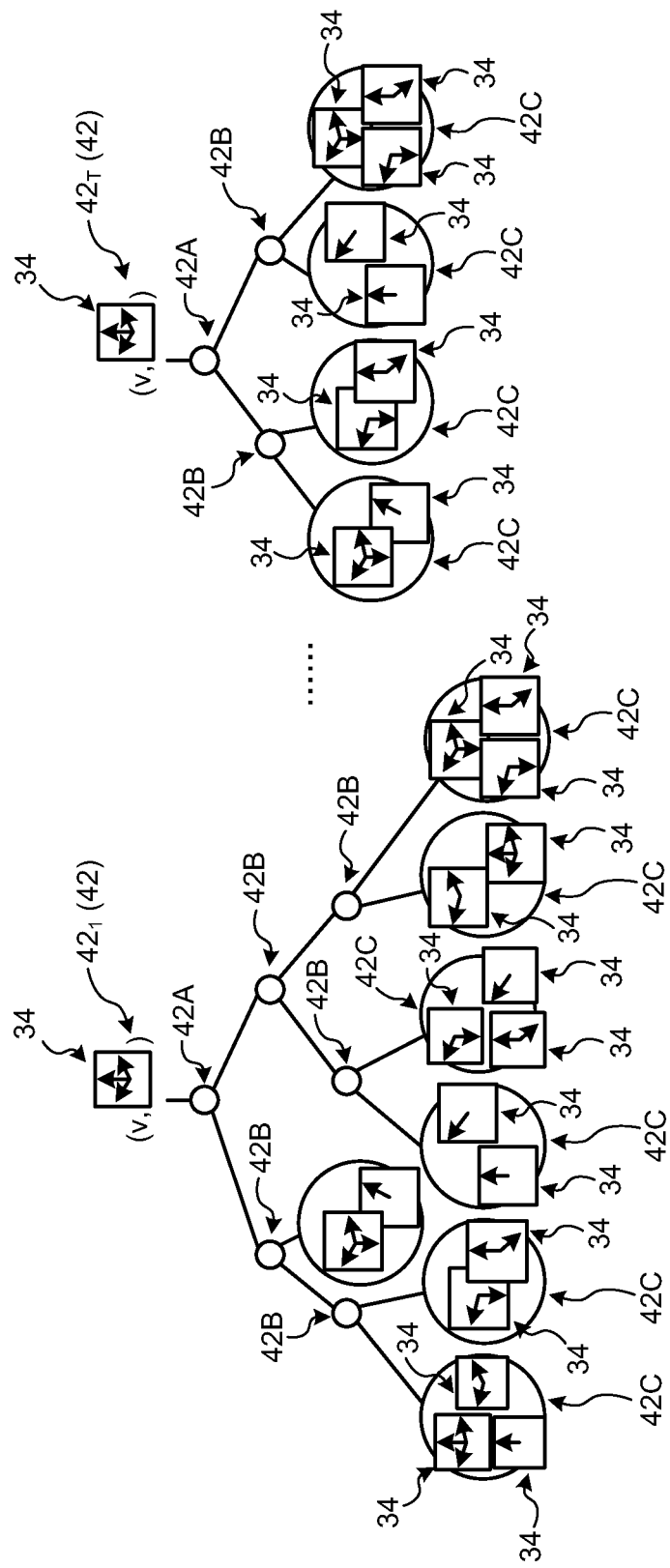
FIG. 7 is an explanatory diagram of a random forest.

FIG. 7 is an explanatory diagram of a plurality of the learned random trees 42 (that is, a random forest). The respective random tree $42_1$ to random tree $42_T$ have different division indexes for each node. Accordingly, for example, even when all the feature amounts v with the labels 34 allocated to the root nodes 42A are the same, the random tree $42_1$ and the random tree $42_T$ might have the different feature amounts v with labels that belong to the leaf nodes 42C. The example illustrated in FIG. 7 illustrates the label 34 alone in the leaf node 42C. In practice, the feature amounts v with the labels 34 belong to the respective leaf nodes 42C.

Referring back to FIG. 1, the first predicting unit 15 predicts a representative label for each cluster divided by the learning unit 14 during learning. The first predicting unit 15 predicts the representative label from the label(s) 34 given to one or a plurality of the feature amounts v that belong to the cluster.

As described above, in this embodiment, the cluster means the leaf node 42C that is the node at the end of the random tree 42. Accordingly, the first predicting unit 15 predicts the representative label of each of the respective leaf nodes 42C from the labels 34 given to the respective feature amounts v that belong to the leaf node 42C.

Figure 8:
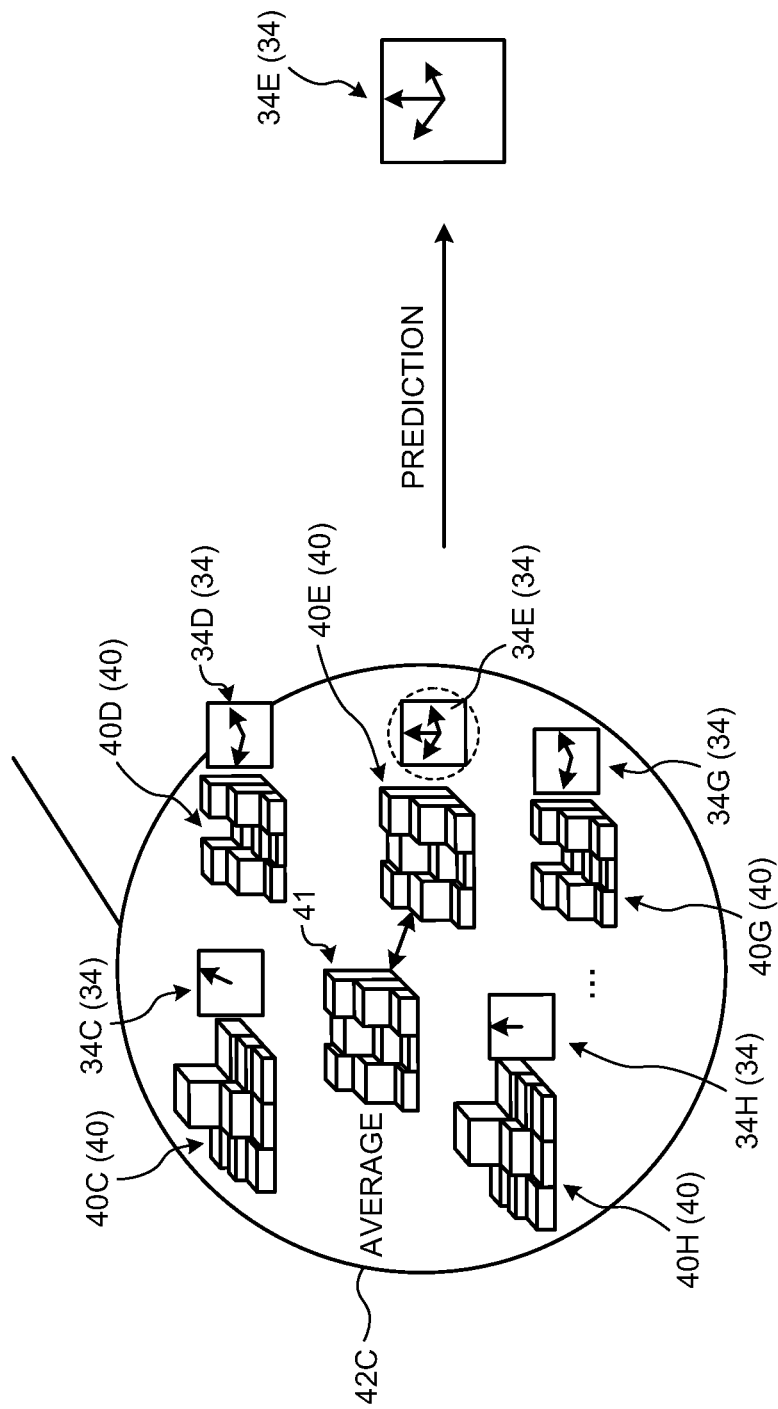
FIG. 8 is a diagram for explaining prediction of a representative label.

FIG. 8 is a diagram for explaining prediction of the representative label. In FIG. 8, a description is given of one leaf node 42C as an example. Firstly, the first predicting unit 15 reads the labels 34 given to all the respective feature amounts v that belong to the leaf node 42C. In the example illustrated in FIG. 8, the first predicting unit 15 reads labels 34C, 34D, 34E, 34G, and 34H. Subsequently, the first predicting unit 15 calculates an average histogram 41 that is the average of the voting histograms 40 (40C, 40D, 40E, 40G, and 40H) corresponding to these respective labels 34C, 34D, 34E, 34G, and 34H.

Subsequently, the first predicting unit 15 selects the voting histogram 40 close to the average histogram 41 among the plurality of these voting histograms 40 (40C, 40D, 40E, 40G, and 40H) that belong to the leaf node 42C. The first predicting unit 15 is preferred to select the voting histogram 40 closest to the average histogram 41 among the plurality of the voting histograms 40 (40C, 40D, 40E, 40G, and 40H) that belong to the leaf node 42C. In the example illustrated in FIG. 8, the first predicting unit 15 selects the voting histogram 40E closest to the average histogram 41. Then, the first predicting unit 15 predicts the label 34E that is the label 34 corresponding to this voting histogram 40E as the representative label of the leaf node 42C.

The first predicting unit 15 performs similar processing on all the leaf nodes 42C in all the random trees 42 learned by the learning unit 14 to predict the representative labels of the respective leaf nodes 42C.

Figure 9:
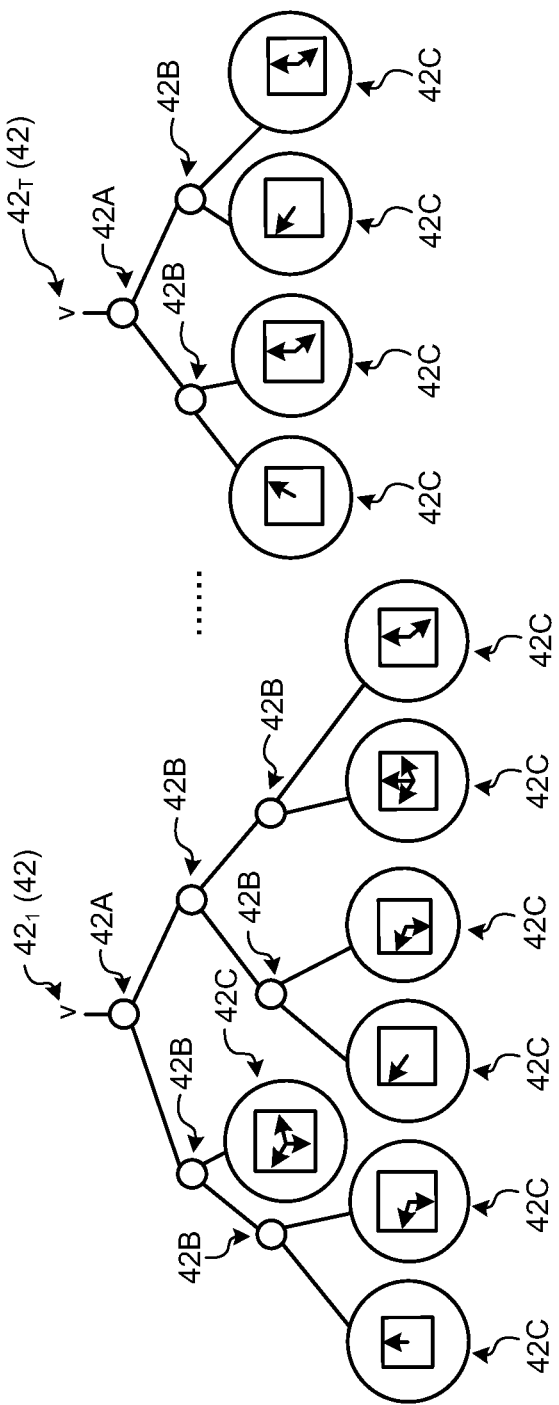
FIG. 9 is an explanatory diagram of the random forest.

FIG. 9 is an explanatory diagram of the random trees 42 after the representative labels are predicted.

As illustrated in FIG. 9, the first predicting unit 15 predicts the representative label for each leaf node 42C so as to predict the representative labels of all the leaf nodes 42C for each random tree 42 for all the respective random trees 42 (the random trees $42_1$ to $42_T$) included in the random forest learned by the learning unit 14.

Figure 10:
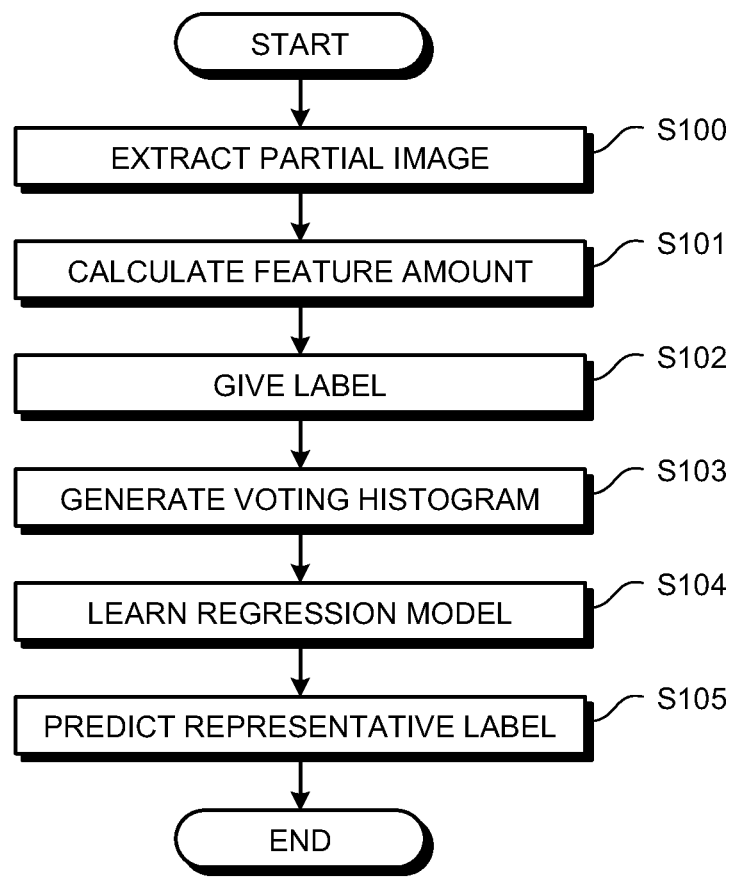
FIG. 10 is a flowchart illustrating a procedure of a learning process.

Subsequently, the procedure of the learning process executed by the learning apparatus 1 will be described. FIG. 10 is a flowchart illustrating the procedure of the learning process executed by the learning apparatus 1.

Firstly the first extracting unit 10 extracts a plurality of partial images from the learning image 30 (in step S100). Subsequently, the first calculator 11 calculates the respective feature amounts of the plurality of the first partial images 32 extracted by the first extracting unit 10 (in step S101).

Subsequently, the retrieving unit 12 gives the labels to the respective feature amounts of the plurality of the first partial images 32 calculated in step S101 (in step S102). The voting unit 13 calculates the histogram 36 from the label 34 and votes the histogram 36 into the parameter space 38, so as to generate the voting histogram 40 (in step S103).

Subsequently, the learning unit 14 learns the regression model representing the relationship between the feature amount of the first partial image 32 and the relative position of the object included in the first partial image 32 (in step S104). In this embodiment, as described above, the random tree 42 is learned as the regression model.

Subsequently, the first predicting unit 15 predicts the representative label for each cluster (the leaf node 42C) divided by the learning unit 14 during learning (in step S105).

Then, the controller 17 stores the random tree 42 as the above-described learned regression model and the representative labels of the clusters (the leaf nodes 42C) in a memory (not illustrated) as dictionary data for density measurement. Here, the controller 17 may transmit the dictionary data for density measurement to the density measuring apparatus described later. Then, this routine is terminated.

Next, a density measuring apparatus 2 will be described.

The density measuring apparatus 2 is an apparatus that measures the density of the object included in an input image using the regression model learned by the learning apparatus 1 and the representative labels predicted by the learning apparatus 1.

Figure 11:
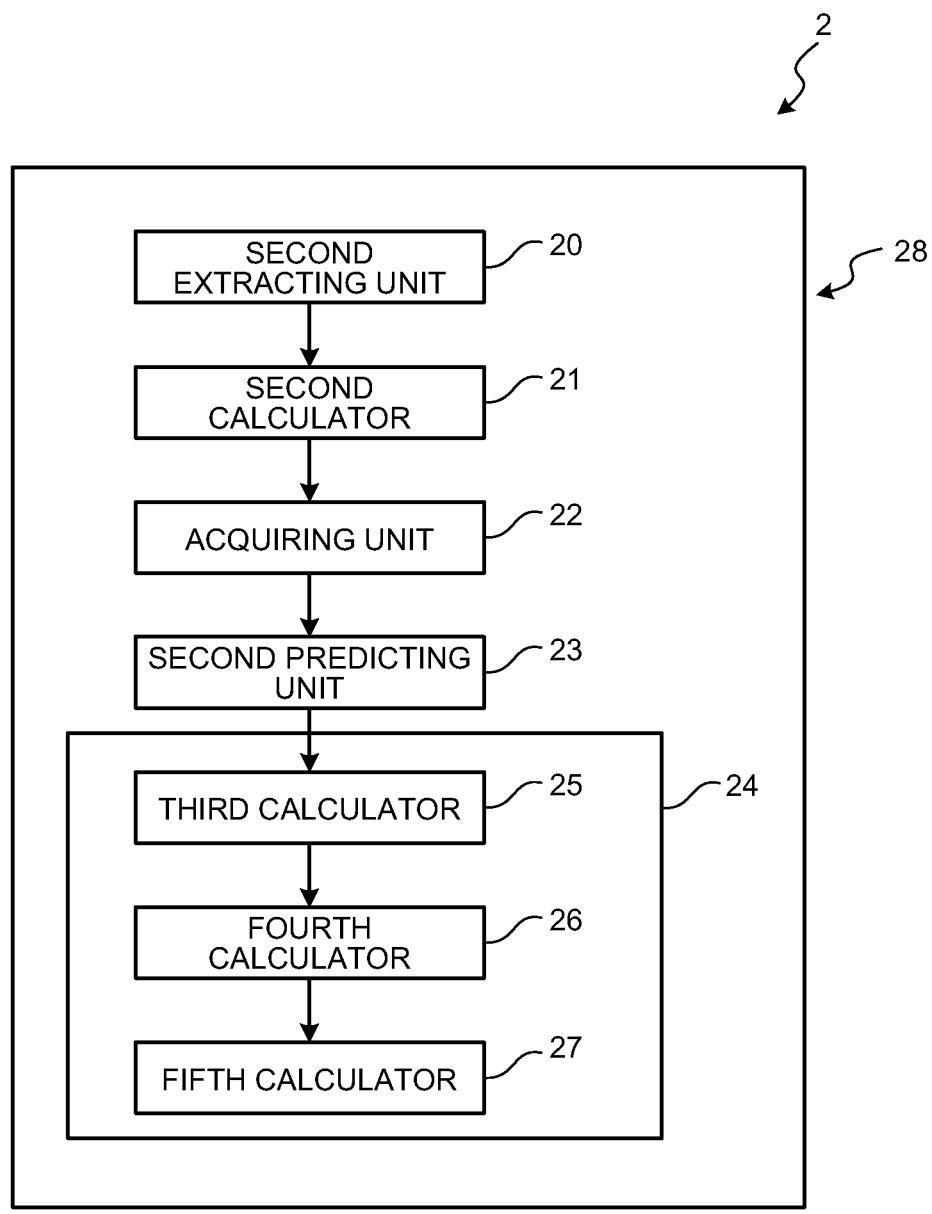
FIG. 11 is a block diagram illustrating a functional configuration of a density measuring apparatus.

FIG. 11 is a block diagram illustrating a functional configuration of the density measuring apparatus 2 according to this embodiment. The density measuring apparatus 2 includes a controller 28. The controller 28 is a computer that includes, for example, a CPU, a ROM, and a RAM. Here, the controller 28 may be implemented by circuitry or a circuit other than the CPU.

The controller 28 controls the entire density measuring apparatus 2. The density measuring apparatus 2 includes a second extracting unit 20, a second calculator 21, an acquiring unit 22, a second predicting unit 23, and a density calculator 24.

A part or all of the second extracting unit 20, the second calculator 21, the acquiring unit 22, the second predicting unit 23, and the density calculator 24 may be implemented by, for example, causing a processing unit such as a CPU to execute programs, that is, by software, may be implemented by hardware such as an IC, or may be implemented by combining software and hardware.

The second extracting unit 20 extracts a plurality of second partial images from an input image. The input image is an image used as a target for measuring the density of the object in the density measuring apparatus 2, and is an image different from the learning image. The second extracting unit 20 may acquire the input image from a memory (not illustrated) or may acquire the input image from an external device.

The second partial image is identical to the first partial image, except that the input image is used as an extraction target image instead of the learning image. That is, the second extracting unit 20 extracts the second partial image from the input image similarly to the first extracting unit 10.

The second calculator 21 calculates the feature amount of each of the plurality of the second partial images extracted by the second extracting unit 20. The second calculator 21 calculates the feature amount similarly to the first calculator 11.

The acquiring unit 22 acquires the dictionary data for density measurement. The acquiring unit 22 may receive the dictionary data for density measurement from the learning apparatus 1 to acquire the dictionary data for density measurement. Alternatively, the acquiring unit 22 may read the dictionary data for density measurement from a memory (not illustrated) disposed in the learning apparatus 1 to acquire the dictionary data for density measurement. The dictionary data for density measurement includes the random tree 42 as the regression model learned by the learning apparatus 1 and the respective representative labels of the leaf nodes 42C.

The second predicting unit 23 assigns the feature amount calculated from the second partial image to the variable of the random tree 42 acquired by the acquiring unit 22. Accordingly, the second predicting unit 23 predicts the representative label corresponding to each second partial image.

Here, in the case where one random tree 42 is acquired by the acquiring unit 22, the second predicting unit 23 predicts one representative label for each second partial image using one random tree 42. On the other hand, in the case where a plurality of the random trees 42 are acquired by the acquiring unit 22 (that is, in the case of the random forest), the second predicting unit 23 obtains, for each second partial image, a plurality of representative labels corresponding to the respective plurality of the random trees 42 and predicts one of these plurality of the representative labels as the representative labels to be used for density measurement.

Figure 12:
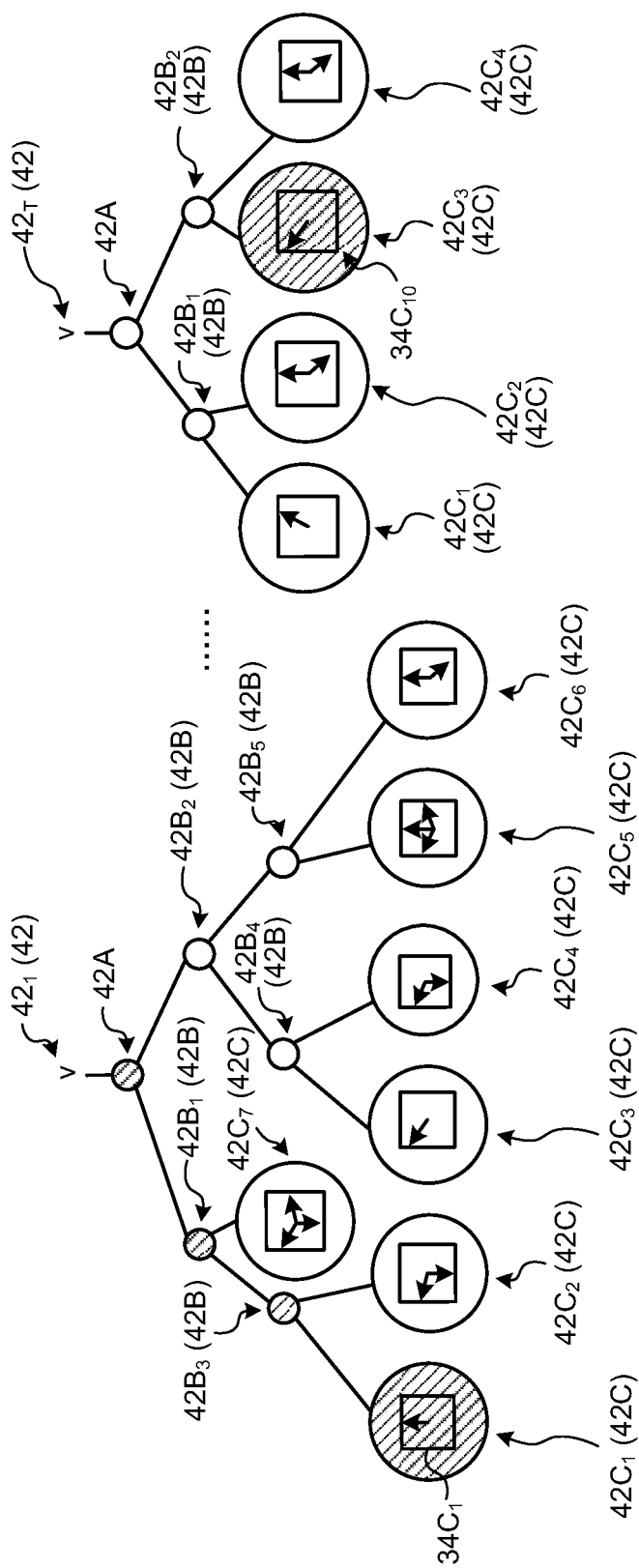
FIG. 12 is a diagram for explaining prediction of the representative label.

FIG. 12 is a diagram for explaining prediction of the representative labels performed by the second predicting unit 23. Assume that the random trees 42 acquired by the acquiring unit 22 and the representative labels are the random trees 42 (the random trees $42_1$ to $42_T$) and the representative labels illustrated in FIG. 12, respectively.

In this case, the second predicting unit 23 assigns the feature amount of the second partial image to each of the root nodes 42A of the respective random trees 42 (the random trees $42_1$ to $42_T$) included in the random forest. Then, the second predicting unit 23 goes down the tree structure from the root node 42A via the child node 42B to the leaf node 42C in accordance with the division indexes determined for each node of the random trees 42 (the random trees $42_1$ to $42_T$). Then, the second predicting unit 23 reads the representative label that belongs to the destination leaf node 42C.

Accordingly, the second predicting unit 23 obtains a plurality of representative labels obtained for the respective random trees 42 (the random trees $42_1$ to $42_T$) as the representative label corresponding to the feature amount of one second partial image.

For example, a feature amount v1 of a certain second partial image is assumed to be assigned to the root node 42A as the variable of the random tree $42_1$. Then, child nodes $42B_1$ and $42B_3$ among child nodes $42B_1$ to $42B_5$ are traced to reach $42C_1$ among leaf nodes $42C_1$ to $42C_7$. In this case, the representative label determined by the random tree $42_1$ for this feature amount v1 is a label $34C_1$.

Additionally, this feature amount v1 is assumed to be assigned to the root node 42A as the variable of the random tree $42_T$. Then, a child node $42B_2$ among child nodes $42B_1$ to $42B_2$ is traced to reach $42C_3$ among leaf nodes $42C_1$ to $42C_4$. In this case, the representative label determined by the random tree $42_T$ for this feature amount v1 is a label $34C_{10}$.

Subsequently, the second predicting unit 23 predicts one of the representative labels obtained for all the respective random trees 42 (the random trees $42_1$ to $42_T$) as the representative label used for density measurement. The second predicting unit 23 predicts the representative label for density measurement similarly to the first predicting unit 15.

That is, the second predicting unit 23 calculates the average histogram of the voting histograms 40 corresponding to the representative labels obtained for all the random trees 42 (the random trees $42_1$ to $42_T$). Then, the second predicting unit 23 predicts the representative label corresponding to the voting histogram 40 closest to this average histogram among the plurality of the representative labels for all the random trees 42 (the random tree $42_1$ to $42_T$) as the representative label used for density measurement.

Referring back to FIG. 11, the density calculator 24 calculates the average density of the objects included in the input image. The density calculator 24 calculates the density distribution of the objects in each of the plurality of second partial images based on the relative positions of the objects represented by the representative labels corresponding to the respective second partial images predicted by the second predicting unit 23.

The density calculator 24 includes a third calculator 25, a fourth calculator 26, and a fifth calculator 27. The density calculator 24 may read the first position used in the learning apparatus 1 from the dictionary data for density measurement. In this case, the learning apparatus 1 only needs to generate the dictionary data for density measurement such that the first position is included.

The third calculator 25 calculates the density distribution of the objects in each of the plurality of the second partial images based on the relative positions of the objects represented by the representative labels corresponding to the respective plurality of the second partial images. The third calculator 25 preliminarily stores the first position used in the learning apparatus 1. The representative label is the above-described representative label used for density measurement.

For example, the third calculator 25 uses a probability density function N( ) of the normal distribution to calculate a density distribution Di(x) of the objects in the second partial image.

$$Di(x)=\Sigma N(x;lj,\sigma) \qquad (3)$$

In the formula (3), x denotes any position in the second partial image. In the formula (3), lj denotes a predicted relative position of the object. In the formula (3), σ denotes dispersion.

The fourth calculator 26 arranges, at the position corresponding to each of the plurality of the second partial images in the input image, the density distribution of the second partial image. Arranging the density distribution means pasting, to the position corresponding to each of the plurality of the second partial images in the input image, the density distribution of the corresponding second partial image.

Here, the plurality of the second partial images extracted from the input image might at least partially overlap with one another. Accordingly, when the density distribution of the second partial image extracted from the input image is arranged in the input image, at least a part of the density distributions corresponding to the respective second partial images might overlap with one another.

Therefore, the fifth calculator 27 calculates, for each of pixels constituting the input image, a first average value of the densities of the objects, according to the frequency of overlap of the density distributions in the input image. Then, the fifth calculator 27 calculates the averaged value of the first average values of all the pixels constituting the input image as the average density of the objects included in the input image.

For example, the fifth calculator 27 calculates the average density of the objects included in the input image using the following formula (4).

$$D(x)=(\Sigma Di(x))/C(x) \quad (4)$$

In the formula (4), D(x) denotes an average density. In the formula (4), x denotes any position in an input image. In the formula (4), C(x) denotes the number of second partial images including the position x among a plurality of second partial images extracted by the second extracting unit 20.

Figure 13:
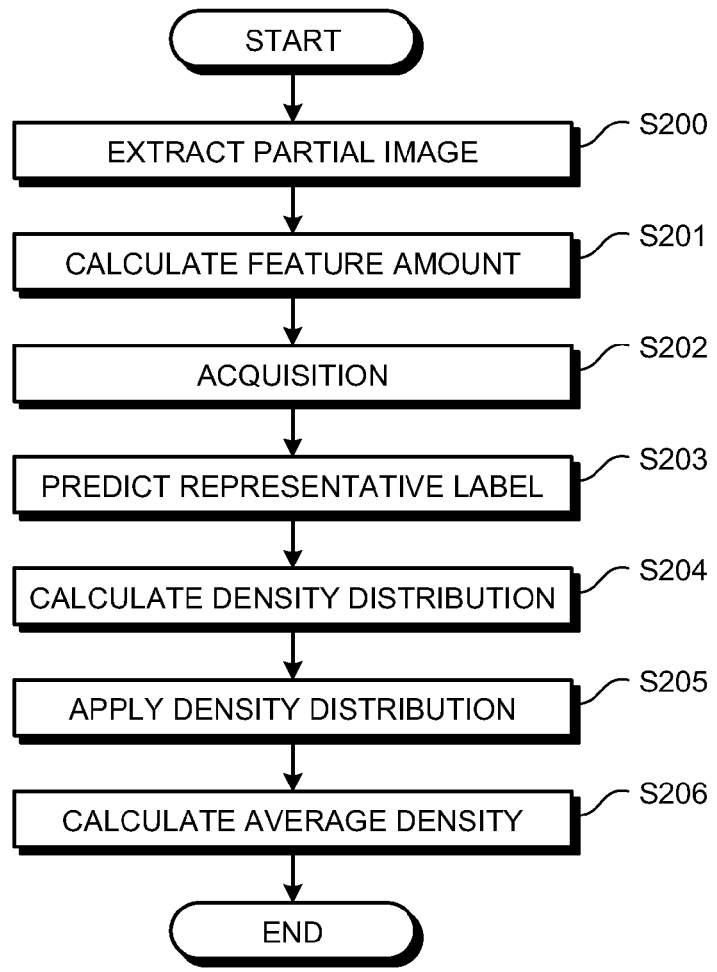
FIG. 13 is a flowchart illustrating a procedure of a density measuring process.

The following describes a density measuring process executed by the density measuring apparatus 2. FIG. 13 is a flowchart illustrating the procedure of the density measuring process.

Firstly, the second extracting unit 20 extracts a plurality of second partial images from an input image (in step S200). Subsequently, the second calculator 21 calculates the feature amounts of the plurality of second partial images (in step S201).

Subsequently, the acquiring unit 22 acquires dictionary data for density measurement (the random tree 42 and the representative label) (in step S202). The second predicting unit 23 assigns the feature amount calculated from the second partial image to the variable of the random tree 42 acquired by the acquiring unit 22. Accordingly, the second predicting unit 23 predicts the representative labels corresponding to the respective second partial images (in step S203).

Subsequently, the third calculator 25 calculates the density distribution of the objects in each of the plurality of second partial images based on the relative positions of the objects represented by the representative labels (in step S204).

Subsequently, the fourth calculator 26 arranges, at the position corresponding to each of the plurality of second partial images in the input image, the density distribution of the corresponding second partial image (in step S205). Subsequently, the fifth calculator 27 calculates the average density of the objects included in the input image, according to the frequency of overlap of the density distributions in the input image (in step S206). Then, this routine is terminated.

As described above, in the learning apparatus 1 according to this embodiment, the retrieving unit 12 retrieves the objects included in each of a plurality of the first partial images 32 extracted from the learning image 30. The retrieving unit 12 gives, as a label, a vector representing the relative positions between the first position preliminarily determined by the first partial image 32 and each of all the objects included in the first partial image 32 to the feature amount of the first partial image 32. The learning unit 14 allocates the feature amount with this label to each node to determine the division index of each node, so as to learn the regression model. The first predicting unit 15 predicts the representative label for each leaf node 42C of the regression model.

The label is a vector representing the relative position of the object, and has a small data size. This allows reducing the data volume required for the configuration of the regression model. That is, performing the density calculation using the regression model according to this embodiment allows performing the density calculation of the object with low memory capacity in the density measuring apparatus 2.

The learning apparatus 1 learns the regression model without directly detecting the object from the learning image. Accordingly, the learning apparatus 1 according to this embodiment can learn the regression model that allows performing the density calculation with high accuracy without reduction in measurement accuracy even in the case where the object are small and overlap with one another in the learning image.

Accordingly, the learning apparatus 1 according to this embodiment can provide data (the regression model) for performing the density calculation by the density measuring apparatus 2 with high accuracy and low memory capacity.

The density measuring apparatus 2 performs the density calculation of the object included in the input image using the regression model learned by the learning apparatus 1. The density measuring apparatus 2 performs the density calculation without directly detecting the object from the input image. Accordingly, the density measuring apparatus 2 can similarly perform the density calculation with high accuracy without reduction in accuracy of the density calculation even in the case where the objects included in the input image are small and overlap with one another.

Accordingly, a learning apparatus, comprising: a processor; and a memory that stores processor-executable instructions that, when executed by the processor, cause the processor to: a first extracting unit that extracts a plurality of first partial images from a learning image; a first calculator that calculates a feature amount of the first partial image; a retrieving unit that retrieves objects included in the first partial image, and gives, as a label, a vector to the feature amount, the vector representing relative positions between a first position in the first partial image and each of all objects included in the first partial image; a voting unit that calculates, for each of the plurality of first partial images, a histogram representing a distribution of the relative positions and votes the histogram into a parameter space so as to generate a voting histogram; a learning unit that divides the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image; and a first predicting unit that predicts, for each of the plurality of clusters, a representative label from the label given to the feature amount that belongs to the cluster.

Modification

In the above-described first embodiment, the case where the random forest is used as the regression model has been described. However, the regression model learned by the learning apparatus 1 is not limited to the random forest. For example, the learning apparatus 1 may use a nearest neighbor classifier as the regression model.

Figure 14:
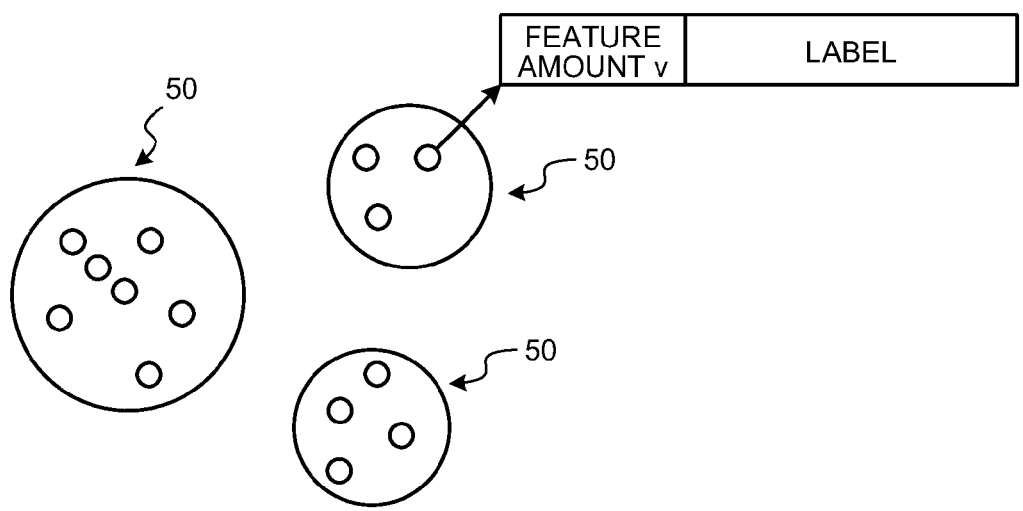
FIG. 14 is a diagram for explaining learning using a nearest neighbor classifier.

FIG. 14 is a diagram for explaining learning using the nearest neighbor classifier. The learning unit 14 (see FIG. 1) divides the feature amount v with the label 34 corresponding to each of a plurality of the first partial images 32 into a plurality of clusters to reduce the variation of the corresponding voting histogram, so as to learn a learning model.

Specifically, the learning unit 14 divides all the feature amounts v with the labels 34 corresponding to the respective plurality of the first partial images 32 into k pieces of clusters by a vector quantization method such as k-means clustering.

Particularly, the learning unit 14 randomly allocates the clusters to any labels 34 and calculates the average value of each cluster. Subsequently, the learning unit 14 obtains the distance between each label 34 and the average value of each cluster and reallocates each label 34 to cluster having the closest average value. In the case where the allocations of all the labels 34 to the clusters are not changed in this sequence of processes, the process is terminated. Otherwise, the process is repeated.

This divides the feature amount v with the label 34 into clusters for each group having similar feature amounts v.

The first predicting unit 15 calculates the average value of the labels 34 given to the feature amounts v that belong to the cluster. Subsequently, the first predicting unit 15 predicts, as the representative label for each cluster, the label 34 closest to the calculated average value among the labels 34 given to the feature amounts v that belong to the cluster.

The density measuring apparatus 2 acquires the nearest neighbor classifier from the learning apparatus 1 as the regression model. In this case, the second predicting unit 23 causes the nearest neighbor classifier to cross-check the feature amount calculated from the second partial image and the representative vector predicted by the learning apparatus 1 for each cluster, so as to select the representative vector with the distance closest to the feature amount calculated from the second partial image. Subsequently, the second predicting unit 23 only needs to predict the representative label corresponding to each second partial image, similarly to the first predicting unit 15, from the collection of the labels 34 given to the feature amounts belonging to the clusters that the selected representative vector belongs to.

Second Embodiment

Figure 15:
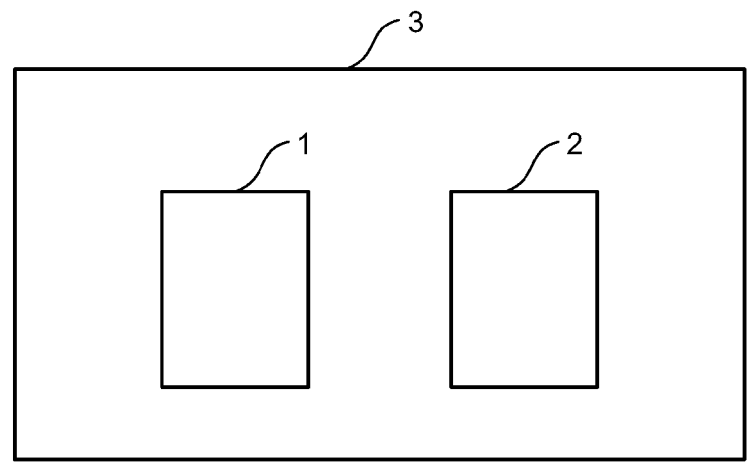
FIG. 15 is an explanatory diagram of a density measuring system.

Next, a density measuring system will be described. FIG. 15 is an explanatory diagram of a density measuring system 3. The density measuring system 3 according to this embodiment includes the learning apparatus 1 and the density measuring apparatus 2. The learning apparatus 1 and the density measuring apparatus 2 are electrically coupled to each other. The learning apparatus 1 and the density measuring apparatus 2 are similar to those in the first embodiment.

Thus, the density measuring system 3 according to this embodiment includes the learning apparatus 1 and the density measuring apparatus 2 described in the first embodiment.

Accordingly, the density measuring system 3 according to this embodiment allows performing the density calculation with high accuracy and low memory capacity.

Here, in the above-described embodiment, the case where the storage 16 is disposed in the learning apparatus 1 has been described. However, the storage 16 may be configured as a storage device coupled to the learning apparatus 1 via a communication line.

Figure 16:
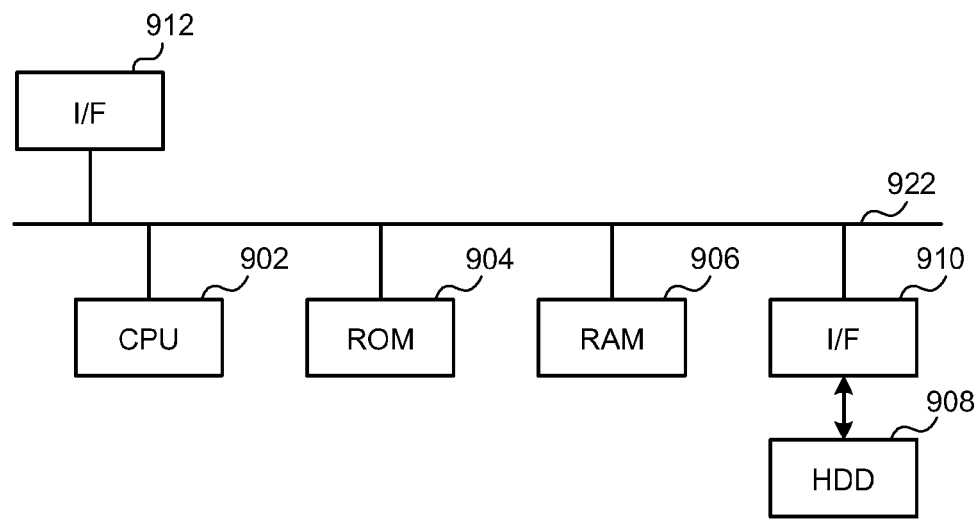
FIG. 16 is a block diagram of the hardware configuration for the learning apparatus, the density measuring apparatus, and the density measuring system.

FIG. 16 is a block diagram illustrating an exemplary hardware configuration for the learning apparatus 1, the density measuring apparatus 2, and the density measuring system 3 according to the above-described embodiment and modification. As illustrated in FIG. 16, the learning apparatus 1, the density measuring apparatus 2, and the density measuring system 3 according to the above-described embodiment and modification each include a CPU 902, a RAM 906, a ROM 904 that stores a program or similar information, an HDD 908, an I/F 910 that is an interface with the HDD 908, an I/F 912 that is an interface for inputting an image, and a bus 922, thus having the hardware configuration using an ordinary computer. Here, the CPU 902, the ROM 904, the RAM 906, the I/F 910, and the I/F 912 are coupled to one another via the bus 922.

The learning apparatus 1, the density measuring apparatus 2, and the density measuring system 3 in the above-described embodiment and modification are each implemented on the computer such that the CPU 902 reads the program from the ROM 904 on the RAM 906 and executes the program.

The programs for executing the above-described learning process and density measuring process executed by the respective learning apparatus 1 and density measuring apparatus 2 of the above-described embodiment may be stored in the HDD 908. Alternatively, the programs for executing the above-described learning process and density measuring process executed by the respective learning apparatus 1 and density measuring apparatus 2 of the above-described embodiment may be provided to be preliminarily incorporated in the ROM 904.

Alternatively, the programs for executing the above-described learning process and density measuring process executed by the respective learning apparatus 1 and density measuring apparatus 2 of the above-described embodiment may be provided as a computer program product stored in a computer-readable storage medium such as a CD-ROM, a CD-R, a memory card, a digital versatile disk (DVD), and a flexible disk (FD) as a file in an installable format or an executable format. Alternatively, the programs for executing the above-described learning process and density measuring process executed by the respective learning apparatus 1 and density measuring apparatus 2 of the above-described embodiment may be stored on the computer connected to a network such as the Internet so as to be provided by downloading through the network. Alternatively, the programs for executing the above-described learning process and density measuring process executed by the respective learning apparatus 1 and density measuring apparatus 2 of the above-described embodiment may be provided or distributed through a network such as the Internet.

The respective steps in the flowchart of the aforementioned embodiments may be executed in a modified execution order, executed at the same time, or executed in a different execution order for each execution insofar as the execution is compatible with the respective steps.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning apparatus, comprising:
a processor; and
a memory that stores executable instructions that, when executed by the processor, facilitate performance of operations, comprising:
first extracting unit a plurality of first partial images from a learning image;
first calculating a feature amount of the first partial image;
retrieving objects included in the first partial image, and gives, as a label, a vector to the feature amount, the vector representing relative positions between a first position in the first partial image and each of all objects included in the first partial image;
calculating, for each of the plurality of first partial images, a histogram representing a distribution of the relative positions and votes the histogram into a parameter space so as to generate a voting histogram;

dividing the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image; and first predicting, for each of the plurality of clusters, a representative label from the label given to the feature amount that belongs to the cluster.

2. The apparatus according to claim 1, wherein the regression model is one or a plurality of random trees, the dividing determines a division index of each node from a root node to a plurality of leaf nodes and determines the feature amount that belongs to each of the plurality of leaf nodes to reduce variation of the voting histogram, so as to learn the regression model, and the first predicting further comprises predicting, for each of the plurality of clusters as the plurality of leaf nodes, the representative label from the label given to the feature amount that belongs to the cluster.

3. The apparatus according to claim 2, wherein the first predicting further comprises calculating, for each of the plurality of clusters, an average histogram of the voting histograms corresponding to the labels given to the respective plurality of feature amounts that belong to the cluster, and predicting, for each of the plurality of clusters, a label corresponding to a voting histogram close to the average histogram, as the representative label, among the labels given to the respective plurality of feature amounts that belong to the cluster.

4. The apparatus according to claim 1, wherein the regression model is a nearest neighbor classifier.

5. A density measuring apparatus, comprising:
a processor; and
a memory that stores executable instructions that, when executed by the processor, facilitate performance of operations, comprising:
second extracting a plurality of second partial images from an input image;
second calculating a feature amount of each of the plurality of second partial images;
acquiring the regression model and the representative label from the learning apparatus according to claim 1;
second predicting that assigns the feature amount of the second partial image to a variable of the regression model so as to predict the representative label corresponding to each of the plurality of second partial images; and
density calculating an average density of objects included in the input image based on the relative positions represented by the representative labels corresponding to the respective plurality of second partial images.

6. The apparatus according to claim 5, wherein the density calculating comprising:

third calculating a density distribution of objects for each of the plurality of second partial images based on the relative positions represented by the representative labels corresponding to the respective plurality of second partial images;

fourth calculating that arranges, at a position corresponding to each of the plurality of second partial images in the input image, the density distribution of the corresponding second partial image; and fifth calculating, for each pixel constituting the input image, a first average value of densities of objects, according to a frequency of overlap of the density distributions in the input image, and calculating an average value of the first average values of the pixels constituting the input image as the average density of objects included in the input image.

7. A learning method, comprising:
extracting a plurality of first partial images from a learning image;
calculating a feature amount of the first partial image;
retrieving objects included in the first partial image to give, as a label, a vector to the feature amount, the vector representing relative positions between a first position in the first partial image and each of all objects included in the first partial image;
calculating, for each of the plurality of first partial images, a histogram representing a distribution of the relative positions to vote the histogram into a parameter space so as to generate a voting histogram;
dividing the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image; and
predicting, for each of the plurality of clusters, a representative label from the label given to the feature amount that belongs to the cluster.

8. A computer-readable storage medium, comprising executable instructions that, when executed by a processor, facilitate performance of operations, comprising:
extracting a plurality of first partial images from a learning image;
calculating a feature amount of the first partial image;
retrieving objects included in the first partial image to give, as a label, a vector to the feature amount, the vector representing relative positions between a first position in the first partial image and each of all objects included in the first partial image;
calculating, for each of the plurality of first partial images, a histogram representing a distribution of the relative positions to vote the histogram into a parameter space so as to generate a voting histogram;
dividing the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image; and
predicting, for each of the plurality of clusters, a representative label from the label given to the feature amount that belongs to the cluster.

9. A density measuring system, comprising a learning apparatus and a density measuring apparatus connected to the learning apparatus, wherein
the learning apparatus includes:
a first extracting unit that extracts a plurality of first partial images from a learning image;
a first calculator that calculates a feature amount of the first partial image;
a retrieving unit that retrieves objects included in the first partial image, and gives, as a label, a vector to the feature amount, the vector representing relative positions between a first position in the first partial image and each of all objects included in the first partial image;
a voting unit that calculates, for each of the plurality of first partial images, a histogram representing a distribution of the relative positions and votes the histogram into a parameter space so as to generate a voting histogram;
a learning unit that divides the feature amount corresponding to each of the plurality of first partial images into a plurality of clusters to reduce variation of the corresponding voting histogram, so as to learn a regression model representing a relationship between the feature amount of the first partial image and the relative position of the object included in the first partial image; and
a first predicting unit that predicts, for each of the plurality of clusters, a representative label from the label given to the feature amount that belongs to the cluster, and the density measuring apparatus includes:
a second extracting unit that extracts a plurality of second partial images from an input image;
a second calculator that calculates a feature amount of each of the plurality of second partial images;
an acquiring unit that acquires the regression model and the representative label from the learning apparatus according to claim 1;
a second predicting unit that assigns the feature amount of the second partial image to a variable of the regression model so as to predict the representative label corresponding to each of the plurality of second partial images; and
a density calculator that calculates an average density of objects included in the input image based on the relative positions represented by the representative labels corresponding to the respective plurality of second partial images.

\* \* \* \* \*